May 21, 1935.  E. L. ROWE ET AL  2,001,941
CHECK VALVE OPERATING DEVICE
Filed Sept. 14, 1934    3 Sheets-Sheet 1

INVENTORS:
ELLIS L. ROWE
STANLEY TAYLOR
By
ATTORNEYS

May 21, 1935. E. L. ROWE ET AL 2,001,941
CHECK VALVE OPERATING DEVICE
Filed Sept. 14, 1934 3 Sheets-Sheet 3
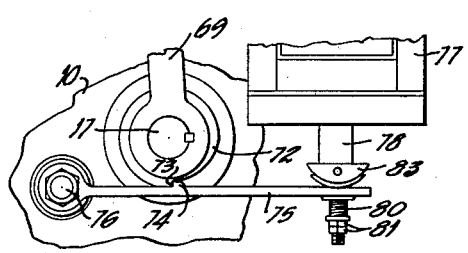
Fig.9
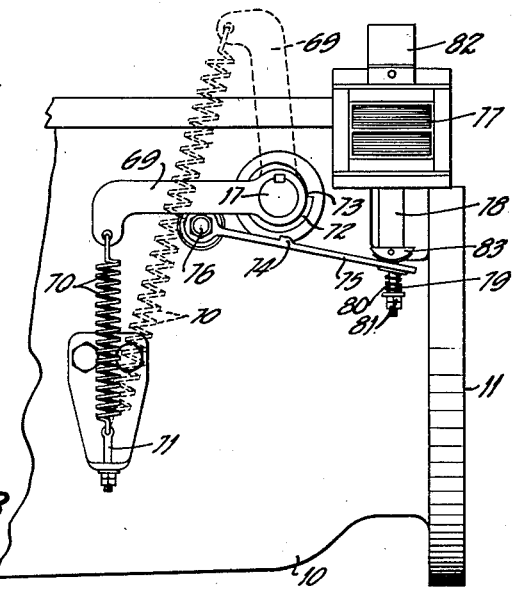
Fig.8
Fig.10
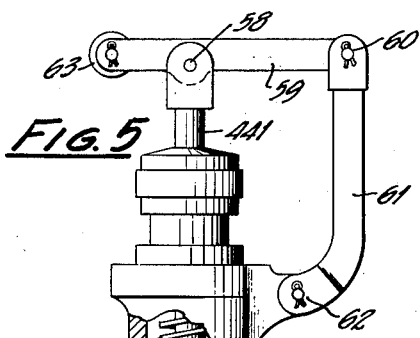
Fig.5
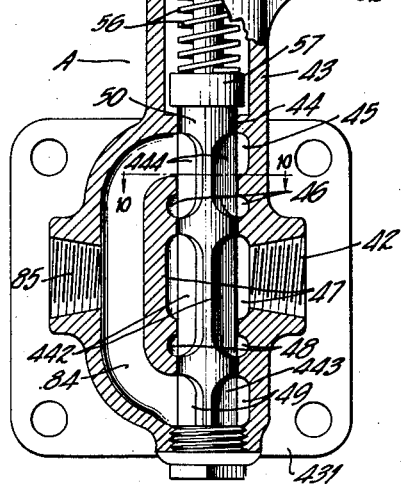
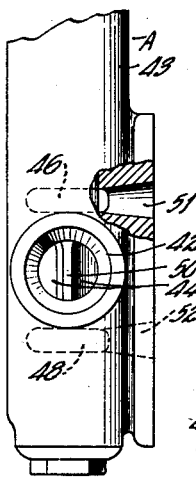
Fig.7
Fig.6
INVENTORS:
ELLIS L. ROWE
STANLEY TAYLOR
BY
ATTORNEYS Patented May 21, 1935

2,001,941

UNITED STATES PATENT OFFICE 2,001,941

CHECK VALVE OPERATING DEVICE

Ellis L. Rowe, Round Lake, and Stanley Taylor, Cohoes, N. Y., assignors to Rensselaer Valve Company, Cohoes, N. Y., a corporation of New York Application September 14, 1934, Serial No. 743,954

15 Claims. (Cl. 137—139)

Check valves which comprise a gate which is movable to closed and open positions are adapted for use in conduits for conducting fluids and particularly in installations designed for water supply systems. Ordinarily the gate of the check valve is operated by liquid flowing through the pipe line. When so operated, however, there is necessarily a difference in pressure on opposite sides of the gate with a resulting loss of head in the pipe line. A further difficulty incident to the operation of check valves of the foregoing character is that the gate is not closed quickly enough to prevent the back surge in the line from causing the gate to slam violently which frequently results in breakage of the gate of the check valve, or other parts thereof and not infrequently causes damage to the pump associated in the pipe line with said valve.

It has hitherto been proposed to retain a gate of the foregoing character in open position by hydraulically operated means. In that device, however, it was proposed that the gate be permanently connected to the hydraulically operated means with the result that during the closing operation of the gate the discharge of the water from the hydraulic cylinder served to retard the movement of the gate toward the closed position thereby producing one of the difficulties above referred to.

One of the objects of our invention is the provision of power operated means and preferably fluid pressure operated means for moving the gate from a partially open position to an open position clear of the flow of fluid therethrough, the parts being so constructed and arranged that the gate is disconnected from the power operated means when it has been moved to the open position.

Means are also provided for retaining the gate of the check valve in open position, said means preferably being operative to release said gate in response to a failure of the source of supply to which the motor for driving a pump, disposed in the pipe line with our valve, is connected. With this construction, substantially no loss of head occurs in the check valve when the pump is in service. Furthermore, means independent of the power operated means are also provided for returning the gate when released to closed position.

A further object of our invention is the provision of means responsive to the initial movement of the gate from closed position for bringing the connection between the gate and the movable member of the power operated means into operative engagement and for actuating the power operated means to complete the movement of the gate to a predetermined open position clear of the flow.

Further objects of our invention will appear in the specification and the objects thereof will be more particularly pointed out in the claims.

Our present invention is an improvement over that shown in our application Serial No. 649,338, filed December 29, 1932.

Our invention will best be understood by reference to the accompanying drawings in which we have illustrated a preferred embodiment thereof and in which—

Fig. 5 is a side elevation partially in section of the four-way valve which controls the pressure operated device;

Fig. 6 is a fragmentary front elevation of Fig. 5, partially in section to illustrate one of the ports;

Fig. 7 is a front view of a plate or dutchman which is interposed between the casing of the four-way valve and the cylinder and forming a part of a four-way valve;

Fig. 8 is a fragmentary side view of the opposite side of the check valve casing from that illustrated in Fig. 1 and illustrating means for retaining the gate in open position and means for returning the same to closed position;

Fig. 9 is a fragmentary view somewhat similar to Fig. 8 illustrating the holding means for the gate in operative position.

Fig. 10 is a section taken along the line 10—10 of Fig. 5; and

Like reference characters indicate like parts throughout the drawings.

Figure 1:
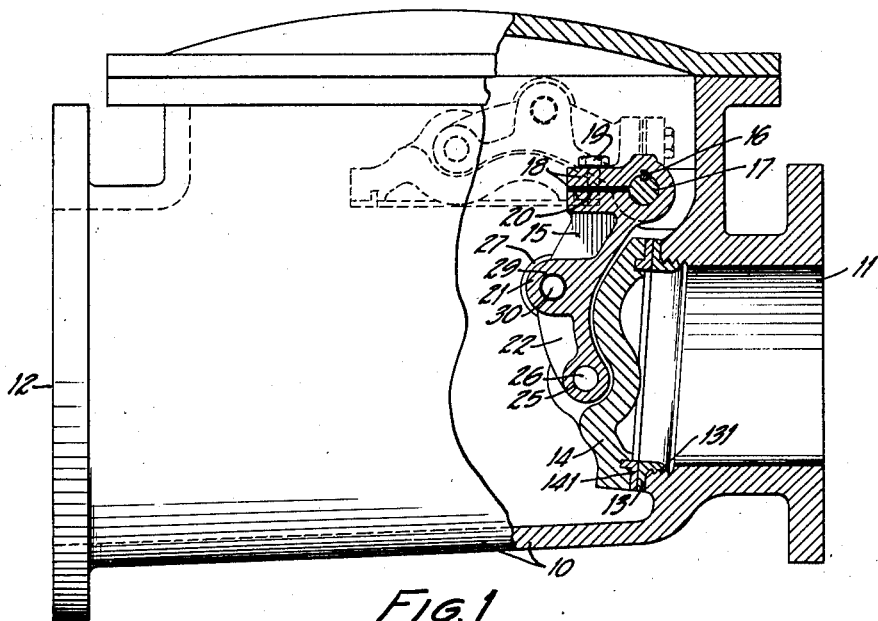
Fig. 1 is a side view of a check valve the casing of which is partially broken away and illustrating the gate and associated parts in section.
Figures 2, 11:
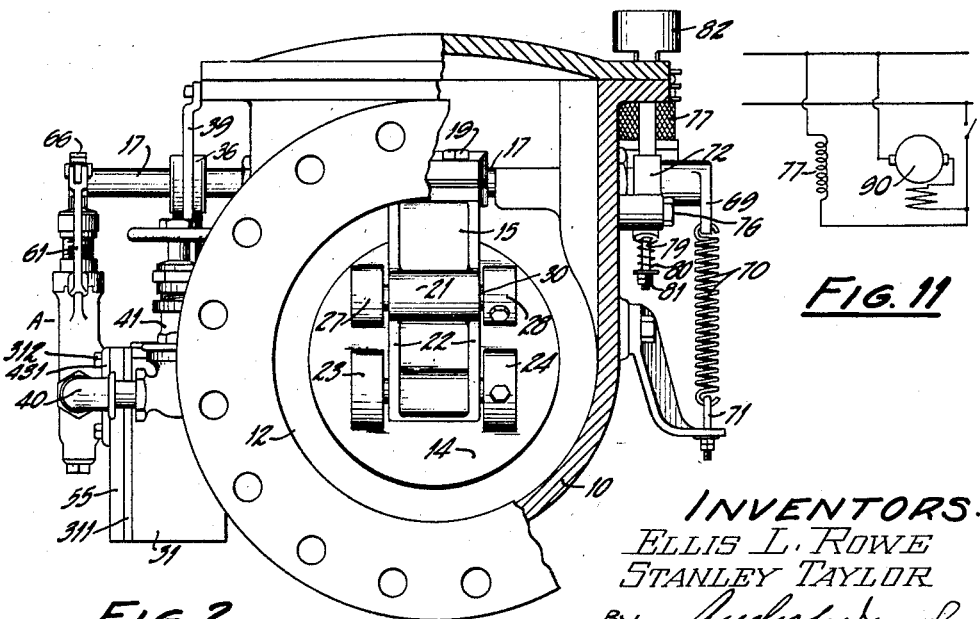
Fig. 2 is a front elevation partially broken away and in section of the check valve removed from the pipe line and the operating parts therefor.
Fig. 11 is a wiring diagram of electrical connections.

Referring to the drawings and first to Figs. 1 and 2, 10 is the casing of a check valve having an inlet 11 and an outlet 12 which in the embodiment illustrated is larger than the inlet, the valve casing thus serving as an increaser. Obviously the inlet and outlet openings of the valve may be of the same size or different sizes depending upon the design of the pipe line in which it is to be interposed. The valve casing is provided with a seat 13 preferably formed of bronze and which may conveniently be secured to the body of the valve casing by screw threads 131. The gate 14 of the valve is preferably circular in form and is supported on a hinge 15 which is in turn secured by means of a key 16 to a shaft 17 extending through and preferably journaled in brass bearings (not illustrated) disposed in the walls of the valve casing as best shown in Fig. 2. While we have illustrated a single hinge, it will be understood that a plurality of hinges may be used, and this latter feature may sometimes be desirable particularly in the larger sizes of valves. The valve casing is provided with packing glands, not illustrated, which are disposed in the opposite side walls thereof and which also serve as bearings for the shaft 17 which extends therethrough. Suitable packing nuts render the glands fluid tight. An increaser unit having an outlet larger than the inlet is commonly employed in pumping stations in addition to the check valve. By combining the increaser unit integrally with the check valve valuable space is saved. Increasing the outlet as compared with the inlet decreases eddy currents and permits the fluid to flow more freely and easily.

The hinge 15 is preferably provided with a clamping device comprising two jaws 18 which extend laterally from the cylindrical portion of the hinge surrounding the shaft 17. Tap bolts 19 passing through the jaws serve to clamp the cylindrical portion of the hinge about the shaft and prevent relative movement between the two. Soft metal shims 20 are preferably disposed between the jaws 18. The foregoing construction permits the easy removal of the shaft through the stuffing box when it is desired to dismantle the valve. The hinge 15 is preferably provided with a lug 21 and with strengthening ribs 22. The gate 14 is provided with two lugs 23 and 24 (see Fig. 2) below the middle portion thereof, said lugs being provided with openings which register with an opening 25 in the rounded end of the hinge 15 and through which a pin or shaft 26 may be inserted thereby pivotally securing the gate 14 to the lower end of the hinge 15. The lower portion of the hinge is preferably curved as illustrated and lies within a concave portion of the gate so that the gate may swing or pivot about the lower portion of the hinge. In order to limit such pivotal movement of the gate away from its hinge, we have provided the gate with lugs 27 and 28 which lie on opposite sides of the lug 21 of the hinge 15. Openings in lugs 27 and 28 register with an opening 29 in the lug 21 of the hinge 15. The opening 29, however, preferably has a diameter somewhat greater than the diameter of the pin 30 which extends through the openings in the lugs 27 and 28 and through the opening 29. It is to be understood, however, that the pin 30 may form a driving fit with the opening 29 in the lug 21 and the diameter of the openings in the lugs 27 and 28 may exceed the diameter of the pin 30 in which case the lugs 27 and 28 of the gate would move relative to said pin whereas in the first case lug 21 of the hinge would move relative to the pin. In either case relative movement of the hinge and the gate is permitted.

The method employed in mounting the gate 14 with respect to the hinge 15 must necessarily be accurate in order that the gate be accurately positioned against its seat and in order to insure this result under all normal operating conditions the gate and its hinge are designed and assembled to provide relative movement therebetween. The method which we have used and find to be very accurate is as follows; the gate 14 is first pivotally secured as hereinbefore described to the lower portion of the hinge 15 and the two elements are then operatively disposed within the valve casing, the hinge 15 being pivotally mounted by means of the shaft 17 and the gate 14 pivotally mounted with respect to the hinge 15. The gate 14 is then manually seated in its closed position, that is to say, the face 141 thereon preferably formed of bronze is brought against the bronze seat 13, the seat preferably being slightly inclined for example at an angle of 5 degrees with respect to the vertical axis of the valve. The gate 14 being accurately positioned against its seat, the lug 21 of the hinge 15 which has been left blank, is then scribed in any suitable manner, the opening through the lug 27 or 28 being used as a guide. The lug 21 is then drilled to provide an opening therein slightly larger in diameter than the openings in the lugs 27 and 28 or the pin 30 which is adapted to extend through the opening 29 of the lug 21. We have thus provided a method for assembling the gate and hinge therefor and placing the same in operative position within the valve casing whereby the gate is properly and accurately positioned with respect to both the seat and the hinge.

Figure 4:
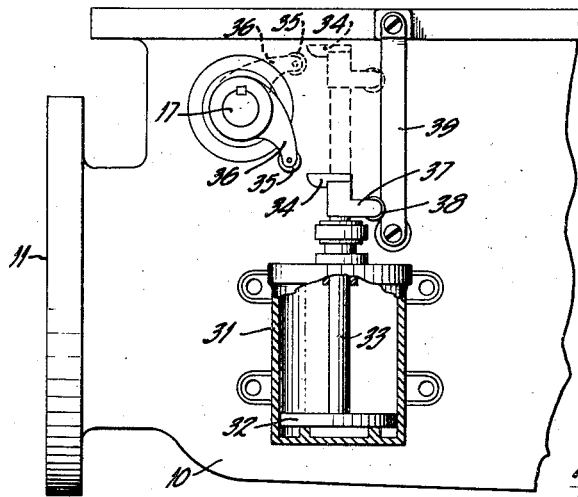
Fig. 4 is a side view similar to Fig. 3 illustrating the fluid pressure operated device for moving the gate to open position, the four-way valve which controls the same being omitted.

In accordance with our invention, after an initial movement of the gate, power means preferably in the form of a fluid pressure operated device are provided for completing the movement of the gate to full open position. Referring particularly to Fig. 4, a cylinder 31 is mounted on the valve casing and is provided with a piston 32 the upper end of the stem 33 of which is provided with a laterally extending plate or head 34 which engages, when the gate has been initially moved, a roller 35 on the end of an arm 36 which is secured to the shaft 17. The stem is also preferably provided with a laterally extending arm 37 on the end of which is mounted a roller 38 engaging a guide bar or rail 39 secured to the valve casing to prevent bending strains from being imposed upon the piston.

Figure 3:
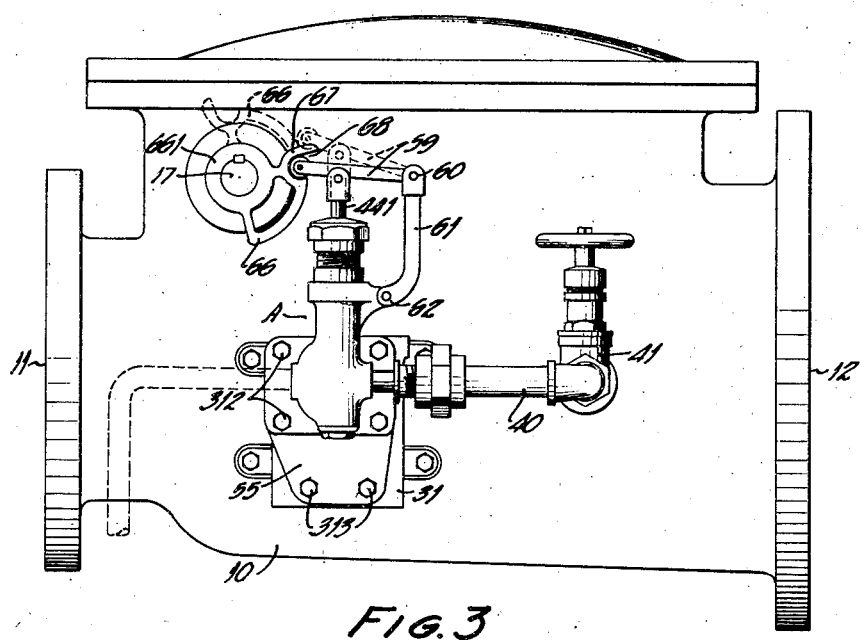
Fig. 3 is a side view of the check valve particularly illustrating the four-way valve which controls the fluid pressure operated means and the parts associated with the four-way valve.

The fluid pressure for operating the piston 32 is preferably supplied from the pipe line. A pipe 40 communicates with the valve casing on the down stream side of the gate as indicated in Fig. 3, the flow of water through the pipe being controlled by a manually operated valve 41. The pipe 40 is connected to a port 42 in the casing 43 of a four-way valve (see Figs. 3 and 5) which is indicated generally at A and which controls the flow of fluid to and from the operating cylinder. The casing has a generally cylindrical bore 44 but provided with annular grooves or recesses 45, 46, 47, 48 and 49 on the interior thereof. A generally cylindrical piston 50 is received in the bore 44 axially spaced portions of the piston being cut away at 442, 443 and 444 as indicated in Fig. 5 and as best shown in Fig. 10. The four-way valve casing is provided with ports 51 and 52 (see Fig. 6) which communicate with the grooves 46 and 48, respectively, of the bore 44 and with ports 53 and 54, respectively, with which an intermediate plate or dutchman 55 is provided. The plate 55 is mounted between the casing of the four-way valve A and the hydraulic cylinder 31 as best indicated in Fig. 2, the plate 55 being secured to a flange 311 formed on the cylinder 31 by tap bolts 312 passing through a flange 431 with which the four-way valve casing is provided and through the plate 55 into the flange 311 of the cylinder 31, additional tap bolts 313 (see Fig. 3) passing through the plate into the flange 311. The piston 50 is normally held in the depressed position illustrated in Fig. 5 by a coil spring 56 which is interposed between a nut or collar 57 on the piston 50 and the upper wall of the valve casing. The upper contracted end 441 of the stem or piston is pivotally connected as at 58 to an arm 59 which is in turn pivotally connected as at 60 to an arm or bracket 61 pivotally connected at 62 to the casing of the four-way valve. The free end of the arm 59 is preferably provided with a roller 63.

The ports 53 and 54 of the plate 55 communicate with passages 64 and 65 respectively with which the plate 55 is provided, the lower end of the passage 64 communicating with a port in the lower end of the operating cylinder 31 while the upper end of the passage 65 communicates with a port in the upper end thereof. By connecting the operating cylinder to the check valve on the down stream side of the gate, pressure is always available for operating the piston of the hydraulic cylinder to move the gate of the check valve to a position clear of the flow of fluid therethrough.

In the embodiment of our invention illustrated, the piston or stem 50 (see Figs. 3 and 5) is actuated by a cam 66 attached to and preferably integral with a collar 661 secured to the shaft 17 as best shown in Fig. 3 and which is preferably in the form of a quadrant. One end of the cam is provided with a lug 67 which forms with the segment a recess 68 in which is received, during a portion of the cycle of operation, the roller 63 on the end of the arm 59.

On the opposite end of the shaft 17 is mounted an arm 69 (see Fig. 8) to the end of which is connected one end of a coil spring 70 the opposite end of which is connected to an adjustable eyebolt 71. A member 72 provided with a notch 73 is also mounted on the same end of the shaft as the arm 69 and cooperates with a latch 74 mounted on an arm 75 which is pivoted as at 76 on the casing.

The arm 75 is actuated by a solenoid 77 suitably mounted on the check valve casing and provided with a plunger 78, a stem 79 attached to the lower end of said plunger passing through the arm 75 and a coil spring 80 being interposed between the arm and an adjusting nut or nuts 81 on the lower end of the stem 79. The upper end of the plunger is provided with a weight 82 suitably attached to the plunger 78. When the gate is moved to the complete open position, assuming that the solenoid 77 is energized, the notch 73 on the member 72 is brought to a position where it may be engaged by the latch 74 which is forced into the notch by the upward movement of the spring 80 which is connected to the plunger and which engages the end of the arm 75. The plunger is also provided with a member 83 which engages the upper side of the arm 75.

Fig. 11 illustrates one manner of electrically connecting the solenoid 77, associated with the valve controlling mechanism, in circuit with an electric motor, indicated at 90, which serves to drive a pump in the pipe line in which our valve is interposed.

The operation of the device embodying our invention is as follows: When the gate is in the closed position illustrated in Fig. 1, the cam or quadrant 66 is in the position illustrated in full lines in Fig. 3, the arm 59 being in its lowered position and the piston of the four-way valve in the position illustrated in Fig. 5. At the same time the arm 36 mounted on the shaft 17 is in the position illustrated in Fig. 4 with the roller 35 which is mounted at the end of the arm out of the path of movement of the plate 34 mounted on the upper end of the piston stem 33. The arm 69 which moves the gate to closed position is in the position illustrated in Fig. 8. When the pump or other means causes liquid to flow through the pipe line, the gate is moved from its closed position illustrated in Fig. 1 through a small angle against the action of the spring 70. The initial movement of the gate and the corresponding rotation of the shaft 17 causes the arm 36 to be moved from the position illustrated in Fig. 4 to a position where the roller 35 is in the path of movement of the plate 34 on the upper end of the piston stem 33. Furthermore, the initial movement of the gate and of the shaft 17 causes the cam 66 to lift the arm 59 to the dotted line position indicated in Fig. 3 thereby lifting the piston or stem 50 of the four-way valve. The lifting of the piston causes the cut-away portion 442 of the piston to connect the grooves 46 and 47 thereby causing fluid under pressure to flow from the valve casing through pipe 40, port 42, groove 47 through the recessed portion 442 to the groove or recess 46, port 51, port 53 through the passage 64 to the port at the lower end of the cylinder 31. At the same time the upper end of the cylinder is connected through a port to the passage 65 and port 54 to the groove or recess 48 and through the cut-away portion 443 of the stem to a passage 84 and to the exhaust port 85. The upward movement of the piston and the plate 34 which is mounted on the upper end of the piston stem rotates the arm 36 and the shaft 17 thereby completing the movement of the gate to a predetermined open position clear of the flow of fluid therethrough. In moving to the position illustrated in Fig. 4 the plate 34 on the piston stem moves past the arm 36 thereby disconnecting the gate from the fluid pressure operated means whereby the gate, so far as said fluid pressure operated means is concerned, is free to return to its closed position independently thereof. The rotation of the shaft 17 rotates the member 72 to a position where the latch 74 on the arm 75 may engage the notch 73 formed in the member 72, and as the solenoid is at this time energized, the latch 74 is moved into and retained within the recess and the gate thereby held in a position to permit a free flow of liquid past the gate without loss of head. It will be understood that the solenoid 77 remains energized while the gate of the check valve is in open position and liquid is forced through the pipe line by a pump driven by an electric motor. The solenoid may conveniently be connected in circuit with the pump motor so that when the circuit to the motor is closed the solenoid is energized and when the circuit of the motor is interrupted the solenoid is at the same time deenergized. When for any reason the solenoid is deenergized, the plunger thereof drops and the weight 82 delivers a sufficient blow to the arm 75 to disengage the latch 74 from the recess 73 thereby permitting the spring 70 which is connected to the arm 69 to return the gate quickly to its closed position. It is evident that as the gate is at this time disconnected from the fluid pressure operated means, the latter does not interfere with the return of the gate. When the gate is returned to closed position, the lug 67 on the cam 66 returns the arm 59 to the full line position indicated in Fig. 3 thereby connecting the supply port 42 to the upper end of the cylinder through groove 47, groove 48, port 52, port 54 and thence through passage 65 to the upper end of the cylinder. At the same time the port 51 which communicates with the lower end of the cylinder is connected by means of the passages 444 to the passage 84 and thus to the exhaust port 85.

Although we have illustrated and described our check valve operating means in conjunction with a preferred form of check valve comprising a specific form of gate assembly, it is to be understood that any form of check valve may be employed. Hence, in the claims, the term "gate" is used to denote gate assemblies in general whether they comprise a plurality of cooperating elements or not.

While we have described our invention in its preferred embodiments, it is to be understood that the words which we have used are words of description and not of limitation. Hence, changes within the purview of the appended claims may be made without departing from the true scope and spirit of our invention in its broader aspects.

What we claim is:

1. In combination, a check valve adapted to be interposed in a pipe line and comprising a pivotally mounted gate movable from closed to open position, power operated means operable after an initial movement of said gate from closed position for completing the movement thereof to open position, said power operated means being operatively disconnected from said gate when the latter is in open position.

2. The combination set forth in claim 1 together with means for retaining said gate in open position.

3. In combination, a check valve adapted to be fitted into a pipe line and comprising a pivotally mounted gate movable from closed to open position, power operated means operable after an initial movement of said gate from closed position for completing the movement thereof to open position, said power operated means being operatively disconnected from said gate when the latter is in open position, means for retaining said gate in open position, and means independent of said power operated means for moving said gate when released to closed position.

4. The combination set forth in claim 3 together with means responsive to the movement of said gate to closed position for returning said power operated means to its initial position.

5. In combination, a check valve adapted to be fitted into a pipe line and comprising a pivotally mounted gate movable from closed to open position, fluid pressure operated means operatively connected to said gate after an initial movement thereof from closed position for completing the movement thereof to open position, means for retaining said gate in open position and means independent of said power operated means for returning said gate to closed position.

6. In combination, a check valve adapted to be interposed in a pipe line and comprising a pivotally mounted gate movable from closed to open position, fluid pressure operated means operatively connected to said gate after an initial movement thereof from closed position for completing the movement thereof to open position, means for retaining said gate in open position, means independent of said power operated means for returning said gate to closed position, and means governed by the movement of said gate for controlling the operation of said fluid pressure operated means.

7. In combination, a check valve adapted to be fitted into a pipe line and comprising a pivotally mounted gate movable through a predetermined arc from closed to open position, fluid pressure operated means operatively connected to said gate after an initial movement thereof from closed position for completing the movement thereof to open position, means for retaining said gate in open position, means independent of said power operated means for returning said gate to closed position, and valve means governed by the movement of said gate for controlling the operation of said fluid pressure operated means.

8. In combination, a check valve adapted to be fitted into a pipe line and comprising a pivotally mounted gate movable from closed to open position, a shaft on which said gate is mounted having its bearings in the casing of said valve an arm mounted on said shaft and power operated means comprising a movable member engageable with said arm after an initial movement of said gate for completing the movement of said gate to open position.

9. In combination, a check valve adapted to be fitted into a pipe line and comprising a pivotally mounted gate movable from closed to open position, a shaft on which said gate is mounted having its bearings in the casing of said valve, an arm mounted on said shaft, power operated means comprising a movable member engageable with said arm after an initial movement of said gate for completing the movement thereof to open position, and means for returning the gate to closed position.

10. In combination, a check valve adapted to be fitted into a pipe line and comprising a pivotally mounted gate movable from closed to open position, a shaft on which said gate is mounted having its bearings in the casing of said valve, a first arm mounted on said shaft, power operated means comprising a movable member engageable with said arm after an initial movement of said gate for completing the movement thereof to open position, a second arm mounted upon said shaft and means associated with said second arm for returning said gate to closed position.

11. In combination, a check valve adapted to be fitted into a pipe line and comprising a pivotally mounted gate movable from closed to open position, a shaft on which said gate is mounted and supported, an arm mounted on said shaft, power operated means comprising a movable member for moving said arm and thereby actuating said gate, said arm initially being out of the path of movement of said member and an initial movement of said gate moving said arm into the path of movement of said movable member, means responsive to an initial movement of said gate for actuating said power operated means, said gate being disconnected from said movable member when said gate has been moved to open position, and means independent of said fluid pressure operated means for returning said gate to closed position.

12. In combination, a check valve adapted to be fitted into a pipe line and comprising a pivotally mounted gate movable from closed to open position, a shaft on which said gate is mounted, an arm mounted on said shaft, power operated means comprising a movable member for moving said arm and thereby actuating said gate, said arm initially being out of the path of movement of said member and an initial movement of said gate moving said arm into the path of movement of said movable member, means responsive to an initial movement of said gate for actuating said power operated means, said gate being disconnected from said movable member when said gate has been moved to open position, and means for retaining said gate in open position.

13. In combination, a check valve adapted to be fitted into a pipe line and comprising a pivotally mounted gate movable from closed to open position, a shaft on which said gate is mounted, an arm mounted on said shaft, power operated means comprising a movable member for moving said arm and thereby actuating said gate, said arm initially being out of the path of movement of said member and an initial movement of said gate moving said arm into the path of movement of said movable member, means responsive to an initial movement of said gate for actuating said power operated means, said gate being disconnected from said movable member when said gate has been moved to open position, means for retaining said gate in open position, and means independent of said power operated means for returning said gate to closed position.

14. In combination, a check valve adapted to be fitted into a pipe line and comprising a pivotally mounted gate movable upwardly from closed to open position, fluid pressure operated means for moving said gate, valve means for controlling the supply of fluid under pressure to said fluid pressure operated means, means responsive to an initial movement of said gate from closed towards open position for actuating said valve means to admit fluid under pressure to said fluid pressure operated means to complete the movement of said gate to open position, means whereby said gate is operatively disconnected from said fluid pressure operated means when the movement of said gate to open position is completed, means for retaining said gate in open position, and means independent of said fluid pressure operated means for returning said gate to closed position.

15. In combination, a check valve adapted to be fitted into a pipe line and comprising a pivotally mounted gate movable upwardly from closed to open position, fluid pressure operated means comprising a movable member, valve means for controlling the admission of fluid under pressure to said fluid pressure operated means, means responsive to an initial movement of said gate from closed position for operatively connecting said movable member to said gate and for admitting fluid under pressure to said fluid pressure operated means and thereby completing the movement of said gate to open position, means for retaining said gate in open position and means independent of said fluid pressure operated means for returning said gate when released to closed position.

ELLIS L. ROWE.
STANLEY TAYLOR.